United States Patent
Lee

(10) Patent No.: US 11,624,401 B2
(45) Date of Patent: Apr. 11, 2023

(54) LINEAR MOTION DEVICE

(71) Applicant: Szu-Ying Lee, New Taipei (TW)

(72) Inventor: Szu-Ying Lee, New Taipei (TW)

( * ) Notice: Subject to any disclaimer, the term of this patent is extended or adjusted under 35 U.S.C. 154(b) by 5 days.

(21) Appl. No.: 17/456,830

(22) Filed: Nov. 29, 2021

(65) Prior Publication Data

US 2022/0205482 A1 Jun. 30, 2022

(30) Foreign Application Priority Data

Dec. 31, 2020 (CN) .......................... 202023297130.6

(51) Int. Cl.
*F16C 29/06* (2006.01)

(52) U.S. Cl.
CPC ...... *F16C 29/0609* (2013.01); *F16C 29/0657* (2013.01); *F16C 29/0602* (2013.01)

(58) Field of Classification Search
CPC .............. F16C 29/0602; F16C 29/0604; F16C 29/0609; F16C 29/0611; F16C 29/0623; F16C 29/064; F16C 29/0657; F16C 29/0671

See application file for complete search history.

(56) References Cited

U.S. PATENT DOCUMENTS

| | | | |
|---|---|---|---|
| 2013/0044968 A1* | 2/2013 | Kondo | F16C 33/6648 384/43 |
| 2014/0254961 A1* | 9/2014 | Aoki | F16C 29/0609 384/45 |
| 2017/0097043 A1* | 4/2017 | Chen | F16C 29/0609 |

FOREIGN PATENT DOCUMENTS

| | | |
|---|---|---|
| DE | 10332922 A1 | 2/2005 |
| DE | 112012004607 T5 | 8/2014 |
| TW | M554526 U | 1/2018 |

* cited by examiner

*Primary Examiner* — Alan B Waits
(74) *Attorney, Agent, or Firm* — Innovation Capital Law Group, LLP; Vic Lin

(57) ABSTRACT

A linear motion device includes a guiding member extending along a first direction and a slide block assembly slidably disposed on the guiding member. The slide block assembly includes a slide block, two ball race members at two sides of the slide block, two circulation members at two sides of the slide block along the first direction, and two end covers assembled on the circulation members. One or more of the circulation members has two revolve channel members. The revolve channel member has an upper protrusion member and a lower protrusion member protruding out of the upper protrusion member. Since the protruding portion of the lower protrusion member can be served as the bottom surface of the revolve curve, stepped structures caused by assembling or component tolerances are not formed between the bottom surface and nearby portions, and the balls can roll stably in the linear motion device.

10 Claims, 8 Drawing Sheets

LINEAR MOTION DEVICE

CROSS-REFERENCE TO RELATED APPLICATION

This non-provisional application claims priority under 35 U.S.C. § 119(a) to Patent Application No. 202023297130.6 filed in China, P.R.C. on Dec. 31, 2020, the entire contents of which are hereby incorporated by reference.

BACKGROUND

Technical Field

The instant disclosure relates to motion device, in particular, to a linear motion device.

Related Art

It is understood that, the linear motion device can be driven by a very small power, and the linear motion device does not produce heats easily. Therefore, the linear motion device is applicable to several scenarios, and the linear motion devices can be served as an important role for transmission devices of apparatuses or products of various assembly lines. Currently different kinds of linear motion devices are widely utilized in fields or devices such as computerized machineries, semiconductor apparatuses, delivery machines, machine tools, and automation engineering equipment.

SUMMARY

Since devices are developed in a trend of miniaturization continuously, the linear motion devices also gradually have the miniaturization demands. However, after the linear motion device is miniaturized, the components of the linear motion device cannot be aligned and positioned with each other. As a result, the assembling difficulty for the linear motion device greatly increases. Moreover, the components of the assembled linear motion device may not be aligned with each other properly to form a stepped structure due to poor precision of positions between the components of the linear motion device. Consequently, the linear motion device cannot be operated properly. For example, a linear motion device known to the inventor has individual components of slide blocks, two cover plates respectively at two sides of the slide blocks, and two end covers respectively at the outermost two sides of the linear motion device. However, the end cover and the slide block or the end cover and the cover plate often cannot be aligned with each other and thus form stepped structures on the linear motion device, which results balls in the linear motion device cannot roll smoothly or properly, thereby greatly decreasing the yield rate of the device.

In view of these, one embodiment of the instant disclosure provided a linear motion device with decreased assembling difficulty and/or improved assembling precision.

According to one embodiment of the instant disclosure, a linear motion device comprises a guiding member and a slide block assembly. The guiding member extends along a first direction. The slide block assembly is slidably assembled on the guiding member. Two rail grooves are at two opposite sides of the guiding member parallel to the first direction. The slide block assembly comprises a slide block, two ball race members, a first circulation member and a second circulation member, a first end cover and a second end cover, a plurality of balls, and two retaining members. The slide block is slidably disposed across the guiding member. The slide block has two ball grooves respectively corresponding to the two rail grooves. Each of the two rail grooves and the corresponding ball groove together form an inner ball race. Each of the two ball race members extends along the first direction. The two ball race members are respectively disposed at two opposite sides of the slide block. Each of the two ball race members has an outer ball race. The first circulation member and the second circulation member are respectively disposed at two opposite sides of the slide block along the first direction. The first circulation member and the second circulation member are respectively in communication with the two inner ball races and the two outer ball races. The first circulation member comprises a plate-shaped portion and two revolve channel members. The plate-shaped portion abuts against the slide block and has a stopping plane. The two revolve channel members protrude from one side of the first circulation member away from the slide block. Each of the two revolve channel members has a revolve curved groove, and each of the revolve curved grooves is in communication with the corresponding outer ball race through a communication channel. Each of the revolve channel members comprises an upper protrusion member, a lower protrusion member, and a connection member. The connection member is connected to the upper protrusion member and the lower protrusion member. A longest extension distance of the upper protrusion member along the first direction is less than a longest extension distance of the lower protrusion member along the first direction. The first end cover and the second end cover are respectively assembled on the first circulation member and the second circulation member. One surface of the first end cover away from the slide block has two assembling grooves, and one surface of the second end cover away from the slide block has two assembling grooves. One surface of the first end cover near to the slide block has a recess to receive the plate-shaped portion. The recess has a positioning plane cooperating with and leaning against the stopping plane. When the positioning plane of the first end cover correspondingly leans against the stopping plane of the plate-shaped portion, the first end cover at least covers the upper protrusion member and the connection member of the corresponding revolve curved groove. Each of the two retaining members passes through the corresponding inner ball race. One of two ends of each of the retaining members is embedded into one of the two assembling grooves of the first end cover, and the other end of each of the retaining members is embedded into one of the two assembling grooves of the second end cover. The two inner wall races, the first circulation member, the first end cover, the two outer ball races, the second circulation member, and the second end cover together form two ball circulation races, and the balls are rollably received in the two ball circulation races.

Accordingly, based on one or some embodiments of the instant disclosure, the longitudinal position of the end cover can be positioned by the stopping plane of the plate-shaped portion, so that the end cover can at least cover the upper protrusion member of the revolve curve groove and a portion of the connection member, and a space for circulatingly rolling the balls is formed between the end cover and the corresponding revolve channel member, so that the assembling of the end cover is achieved. Moreover, in some embodiments, since the lower protrusion member protrudes out of the upper protrusion member, the lower protrusion member can be served as the bottom surface of the revolve curve. Hence, stepped structures caused by assembling or component tolerances are not formed between the bottom surface and nearby portions, and the components of the linear motion device can be positioned at proper positions precisely. Therefore, the balls can roll stably through the junction between the extension member and the revolve channel member or the junction between the revolve channel member and the inner ball race. Moreover, in one or some embodiments of the instant disclosure, the lower portion of the end cover can be designed to be an open end, so that the end cover can be assembled with other components in a top-down manner, and the assembling of the end cover can be achieved through the positioning of the stopping plane.

Accordingly, in one or some embodiments of the instant disclosure, the end cover can be positioned or assembled easily, thereby greatly reducing the precision requirement upon assembling. Moreover, since the assembled position of the end cover is already precisely positioned, the overall precision of the assembled device can be effectively increased as well.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
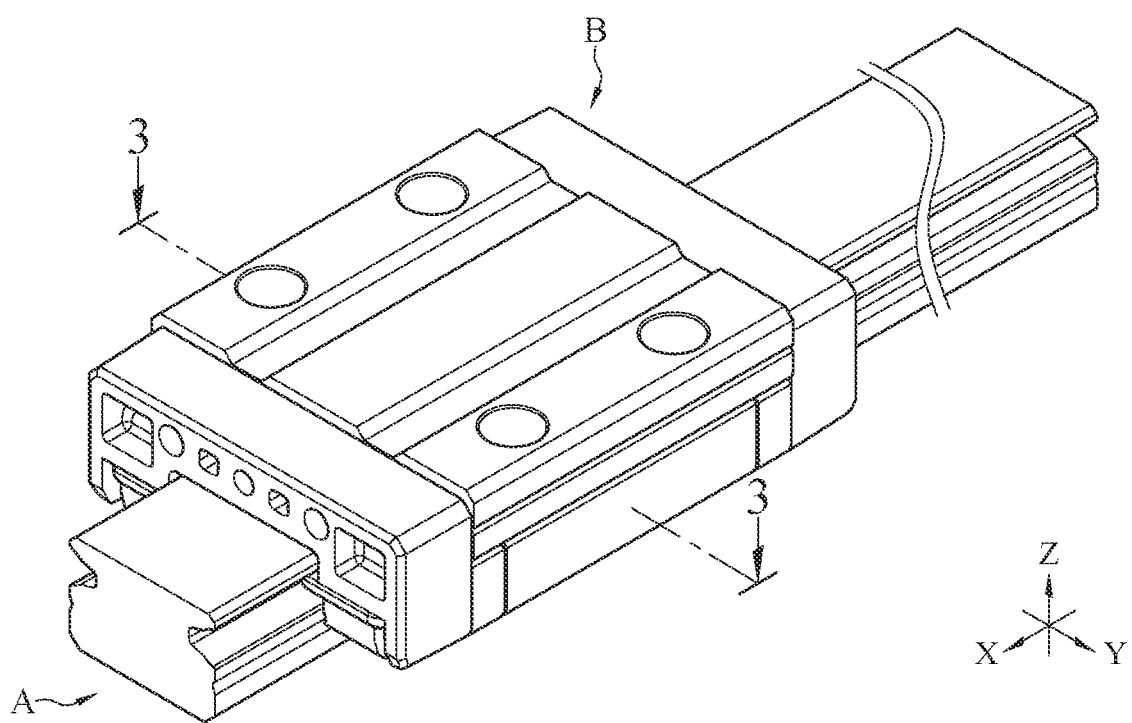
FIG. 1 illustrates a perspective view of a linear motion device according to an exemplary embodiment of the instant disclosure.

The technical contents of the instant disclosure will be described in detail below in conjunction with the embodiments shown in the drawings. The same reference numbers in the drawings indicate the same or similar parts. Moreover, the sentence "two planes are co-planar" or similar sentences in the instant disclosure does not require that the two planes are completely on the same plane, but it is allowed that a reasonable tolerance can exist between the two planes due to manufacturing or assembly processes.

Please refer to FIG. 1. FIG. 1 illustrates a perspective view of a linear motion device according to an exemplary embodiment of the instant disclosure. As shown in FIG. 1, in this embodiment, the linear motion device comprises a guiding member A and a slide block assembly B. The guiding member A extends along a front-rear direction. The slide block assembly B is slidably assembled on and disposed across the guiding member A. In other words, in this embodiment, the slide block assembly B can be moved on the guiding member A back and forth along the guiding member A.

In order to clearly describe the embodiments of the instant disclosure, in the drawings, the extension direction of the guiding member A is referred as a first direction (e.g. the X-axis direction shown in the drawings, or the front-rear direction), and on the same plane, the direction perpendicular to the first direction is referred as a second direction (e.g. the Y-axis direction shown in the drawings, or the left-right direction). Moreover, a direction perpendicular both the first direction and the second direction is referred as a third direction (e.g. the Z-axis direction shown in the drawings, or the top-bottom direction).

Figure 2:
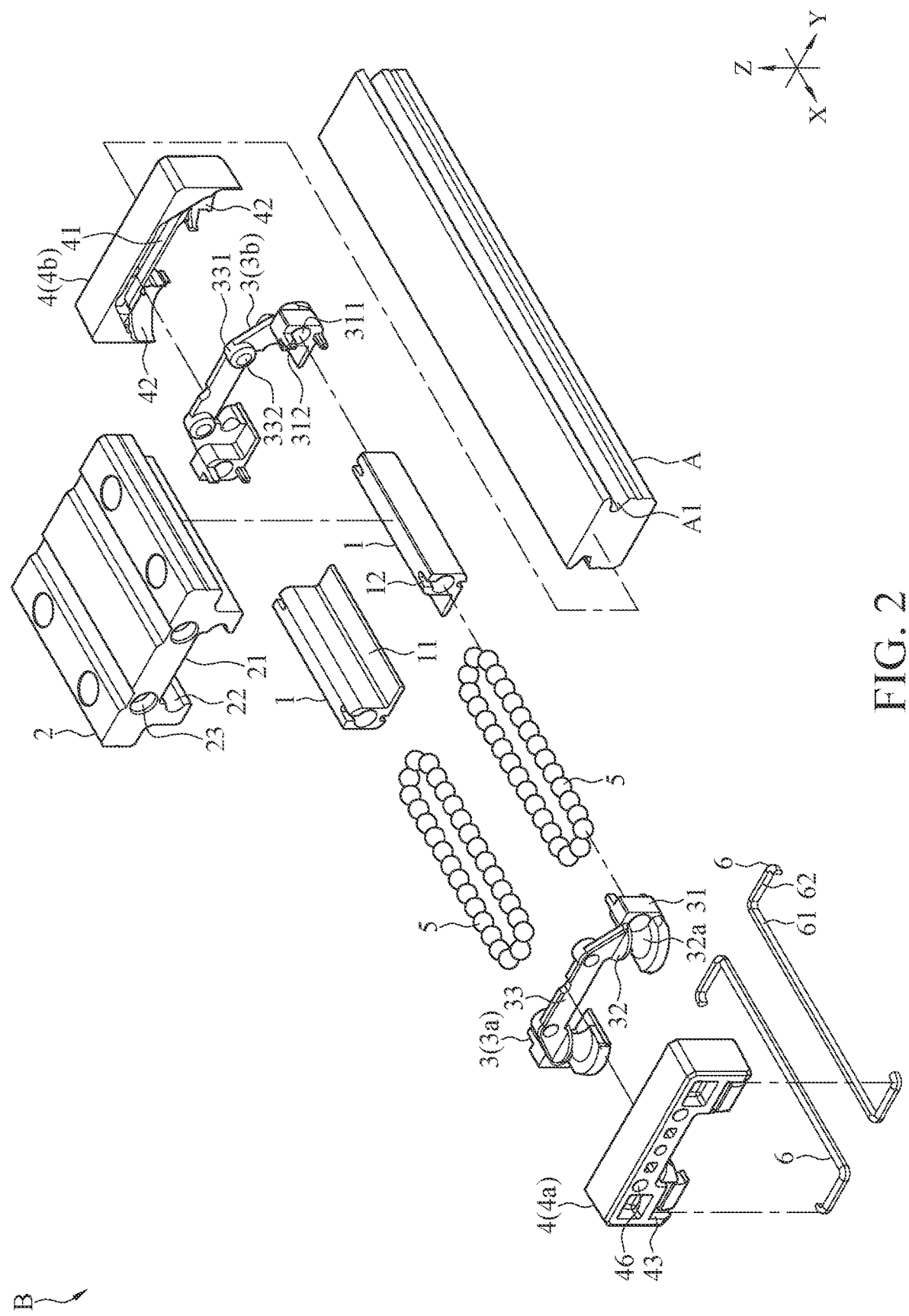
FIG. 2 illustrates an exploded view of the linear motion device of the exemplary embodiment of the instant disclosure.

Next, please refer to FIG. 2, the structure of the slide block assembly B is described in detail. FIG. 2 illustrates an exploded view of a linear motion device according to an exemplary embodiment of the instant disclosure. As shown in FIG. 2, in this embodiment, the slide block assembly B comprises two ball race members 1, a slide block 2, a first circulation member 3a and a second circulation member 3b, a first end cover 4a and a second end cover 4b, a plurality of balls 5, and two retaining members 6. The slide block 2 is slidably disposed across the guiding member A, and the two ball race members 1 are elongated tubular members extend along the first direction (the front-rear direction) with races inside, and the two ball race members 1 are respectively disposed at the left and right sides of the slide block 2. The slide block 2 has a mating opening 21 cooperating with the guiding member A, so that the slide block 2 can be slidably disposed across the guiding member A. Two sides of the mating opening 21 facing the guiding member A are recessed to have two ball grooves 22, and two rail grooves A1 are at the left and right sides of the guiding member A. Each of the ball grooves 22 and the nearby rail groove A1 correspond to each other, so that two races for passing through the balls 5 are formed between the slide block 2 and the guiding member A. For sake of convenience, the race formed by the ball groove 22 and the rail groove A1 is referred as "an inner ball race". On the other hand, the race in the ball race member 1 is referred as "an outer ball race".

In some embodiments, for example, in this embodiment, each of the two ball race members 1 has a bottom plate 11 extending from a bottom portion of the ball race member 1 toward the other ball race member 1, and the slide block 2 is disposed between the ball race members 1 and leans against the bottom plates 11 of the ball race members 1, so that the slide block 2 and the two ball race members 1 can be positioned with each other stably. The outer side wall of the right ball race member 1 and the right side wall of the slide block 2 are coplanar after the slide block assembly B is assembled, and similarly the outer side wall of the left ball race member 1 and the left side wall of the slide block 2 are coplanar after the slide block assembly B is assembled. Therefore, the overall size of the slide block assembly B can be effectively reduced, and the slide block 2 can be stably supported in the slide block assembly B.

Please refer to FIG. 2. In this embodiment, when the slide block 2 is assembled on the two ball race members 1, the first circulation member 3a and the second circulation member 3b are respectively disposed at the front and rear sides of the slide block 2. The first circulation member 3a is connected to one end of each of the two ball race members 1, and the second circulation member 3b is connected to the other end of each of the two ball race members 1. Therefore, the ball race members 1 and the slide block 2 can be positioned and sandwiched between the first circulation member 3a and the second circulation member 3b. Hence, the first circulation member 3a is disposed at one side of the slide block 2 so that each of the inner ball races is in communication with the corresponding outer ball race at one side near the first circulation member 3a, and the second circulation member 3b is disposed at the other side of the slide block 2 so that each of the inner ball races is in communication with the corresponding outer ball race at the other side near the second circulation member 3b.

It is understood that, in embodiment, the first circulation member 3a and the second circulation member 3b have the same structure, but embodiments are not limited thereto. In some embodiments, the first circulation member 3a and the second circulation member 3b are not necessarily the same. In other words, in some embodiments, only one of the first circulation member 3a and the second circulation member 3b has the aforementioned structures. For sake of convenience in illustration, hereinafter, the embodiment of that the first circulation member 3a and the second circulation member 3b have the same structure are used for the description, and the first circulation member 3a and the second circulation member 3b can be referred to each other. Moreover, in this embodiment, since the first circulation member 3a and the second circulation member 3b have the same structure, for the sake of clarity, in the following paragraphs, the first circulation member 3a and the second circulation member 3b are collectively abbreviated as the circulation member 3.

Specifically, in this embodiment, the circulation member 3 comprises two extension members 31, two revolve channel members 32, and a plate-shape portion 33. As shown in FIG. 2, the two extension members respectively extend toward the two ball race members 1 from two ends of one side of the circulation member 3 facing the two ball race members 1, and each of the two extension members 31 is connected to the corresponding ball race member 1. A communication channel 311 is in each of the two extension members 31. The communication channel 311 is in communication with the race in the connected ball race member 1 (the outer ball race), so that the race in the ball race member 1 can be further extended. In some embodiments, the cross-sectional shape of each of the two extension members 31 and the cross-sectional shape of the connected ball race member 1 are the same. In these embodiments, the extension member 31 can be regarded as the extension of the ball race member 1.

Figure 4:
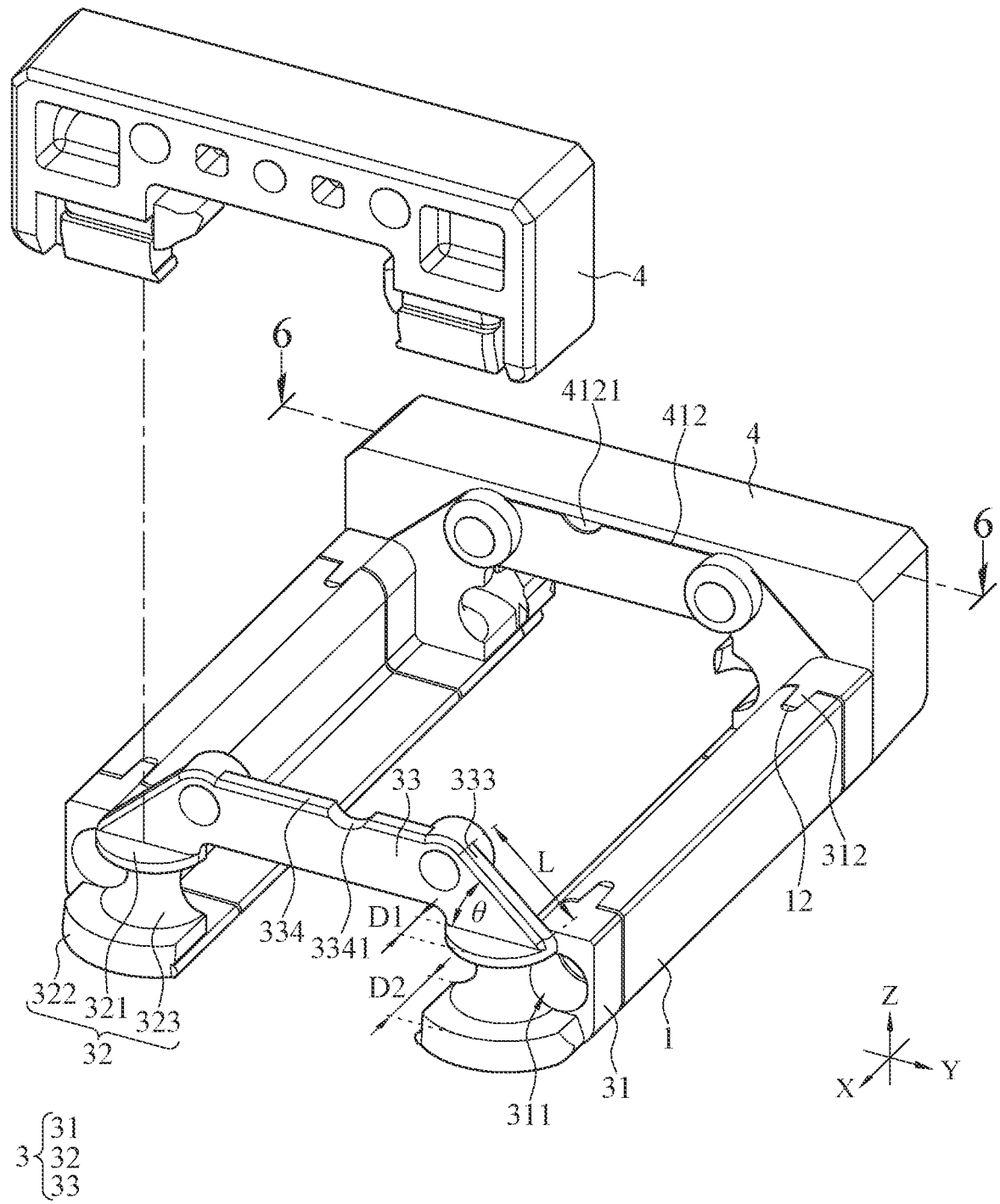
FIG. 4 illustrates a schematic perspective view showing the slide block assembly is to be assembled with the end covers, where the slide block of the slide block assembly is not illustrated.

Please refer to FIG. 2. In this embodiment, each of the two extension members 31 has a latch member 312 protruding toward the corresponding ball race member 1. Each of the two ball race members 1 comprises a latch groove 12 cooperating with the latch member 312. The extension member 31 and the ball race member 1 are connected with each other through the latch member 312 and the latch groove 12 (as shown in FIG. 4). In this embodiment, each of the two extension members 31 has two latch members 312, and each of two ends of the ball race member 1 comprises two latch grooves 12. When the first end cover 4a is observed along the first direction (the X-axis direction), the two latch members 312 are respectively above and below the connection channel 311. The latch member 312 below the connection channel 311 can support the ball race member 1, and the latch member 312 above the connection channel 311 can prevent the ball race member 1 from flipping outward from the slide block 2. Moreover, because of the latch member 312 and the latch groove 12, the connection channel 311 and the race in the ball race member 1 can be positioned with each other rapidly. Hence, in one or some embodiments, the configuration of the latch member 312 and the latch groove 12 further increase the assembling efficiency and the stableness of the slide block assembly B.

Please refer to FIG. 2. In this embodiment, the two revolve channel members 32 are structures protruding from two ends of one side of the circulation member 3 away from the two ball race members 1 toward a direction away from the two ball race members 1. Each of the two revolve channel members 32 has a revolve curved groove 32a to form a semicircular path for connecting the connection channel 311 in the extension member 31 and the race (the inner ball race) formed by the ball groove 22 and the rail groove A1 of the guiding member A.

The circulation member 3 may further have the plate-shaped portion 33, and the plat-shaped portion 33 is above the two revolve channel members 32. When the slide block 2 is sandwiched between the two circulation members 3, the plate-shaped portion 33 can lean against the slide block 2. In this embodiment, one side of the plate-shaped portion 33 facing the slide block 2 has a positioning protrusion 331 protruding toward the slide block 2, one side of the slide block 2 facing the plate-shaped portion 33 has a positioning hole 23, and the positioning protrusion 331 can be engaged with the positioning hole 23. Therefore, the movement of the slide block 2 relative to the plate-shaped portion 33 can be limited, thereby further properly positioning the slide block 2. The plate-shaped portion 33 may further have a through hole 332, and the through hole 332 is defined through from one side of the plate-shaped portion 33 away from the slide block 2 to one end of the positioning protrusion 331 near to the slide block 2. The first end cover 4a and the second end cover 4b may respectively have lock holes 46 corresponding to the through hole 332 and the positioning hole 23. Therefore, through lock members, such as screws, the first end cover 4a, the second end cover 4b, the plate-shaped portion 33, and the slide block 2 can be positioned with each other.

The first end cover 4a and the second end cover 4b are respectively assembled on the two circulation members 3. In this embodiment, the first end cover 4a and the second end cover 4b have the same structure, for the sake of clarity, in the following paragraphs, the first end cover 4a and the second end cover 4b are collectively abbreviated as the end cover 4. One side of the end cover 4 facing the circulation member 3 has a recess 41 and two revolve grooves 42. The recess 41 cooperates with the circulation member 3, and the two revolve grooves 42 are at two ends of the end cover 4. A curved surface is in the revolve groove 42. Therefore, when the end cover 4 is assembled on the circulation member 3 and is positioned on a predetermined position of the circulation member 3, the end cover and the revolve channel member 32 together form the race for circulatingly rolling the balls 5. Moreover, one side of the end cover 4 away from the slide block 2 has an assembling groove 43 for receiving the retaining member 6. Specifically, in this embodiment, the retaining member 6 has a retaining portion 61 and two buckling portions 62 at two ends of the retaining portion 61. The retaining portion 61 of the retaining member 6 passes through the slide block 2 through the mating opening 21 of the slide block 2, and the two buckling portions 62 at two ends of the retaining member 6 are respectively buckled with the assembling grooves 43 of the two end covers 4. Therefore, the two end covers 4 are pressed toward the slide block 2 to achieve the assembling of the slide block assembly B, and the balls 5 can be kept within certain positions in the slide block assembly B to prevent the balls 5 from detaching off the slide block assembly B.

In this embodiment, since the first end cover 4a and the second end cover 4b have the same structure, the first end cover 4a and the second end cover 4b can be referred to each other. It is understood that, the structure of the end cover 4 corresponds to the structure of the circulation member 3, and it is the end cover 4 to be assembled with the aforementioned circulation member 3 has the aforementioned structures of the end cover 4. Therefore, in this embodiment, since the two circulation members 3 have the same structure, the first end cover 4a and the second end cover 4b have the same structure. Conversely, in some embodiments, when the two circulation members 3 have different structures, the first end cover 4a and the second end cover 4b may have different structures. In other words, in such embodiment, one side of the slide block assembly B is assembled with the circulation member 3 and the end cover 4 with the aforementioned structures (e.g., the first circulation member 3a and the first end cover 4a), and the structures of the circulation member 3 and the end cover 4 assembled with the other side of the slide block assembly 2 are thus not limited, as long as two ball circulation races C can be formed at two opposite sides of the guiding member A by the guiding member A, the two ball race members 1, the slide block 2, the two circulation members 3, and the two end covers 4 to allow the balls 5 to be circulatingly moved or rolled in the ball circulating races C.

Figure 3:
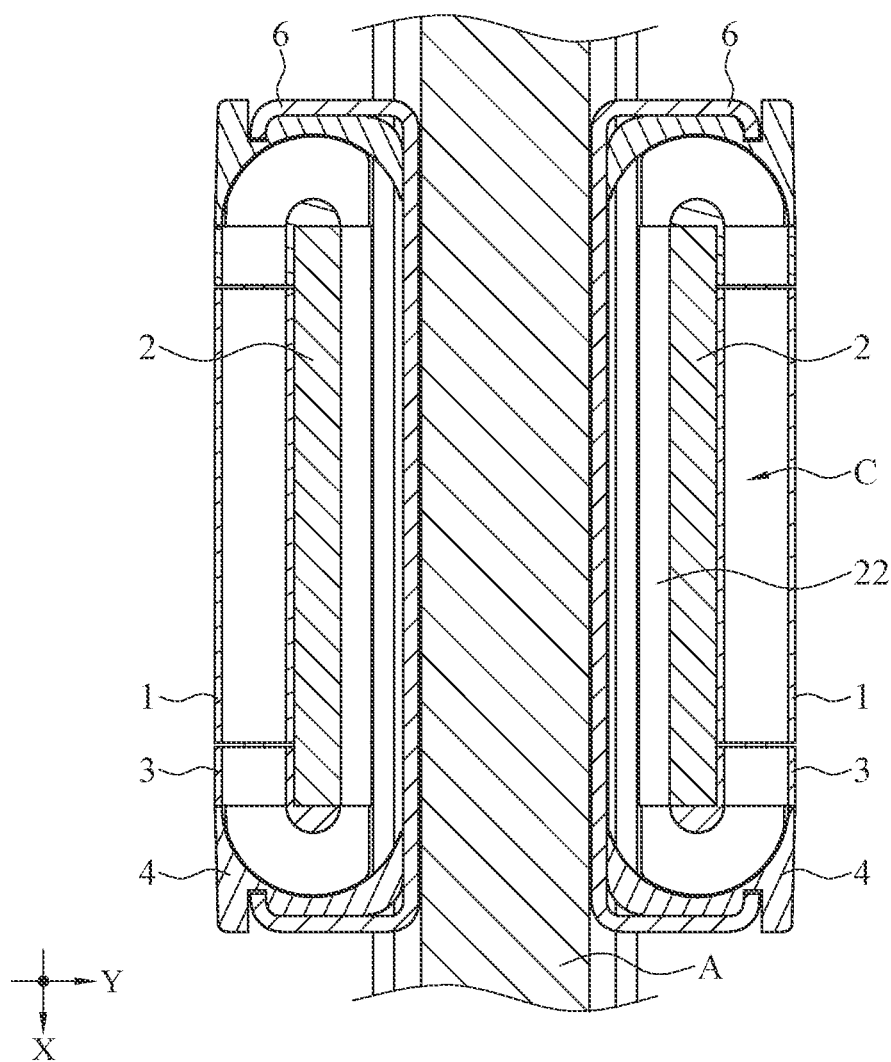
FIG. 3 illustrates a top cross-sectional view of the linear motion device along the line 3-3 shown in FIG. 1 (the balls are not illustrated)

In the following paragraphs, one embodiment of the configuration of the ball circulating race C is described. Please refer to FIG. 2 and FIG. 3. FIG. 3 illustrates a top cross-sectional view of the linear motion device along the line 3-3 shown in FIG. 1, but the balls 5 in the ball circulating race C are not shown. As shown in FIG. 3, when the slide block assembly B is to be assembled on the guiding member A, the ball groove 22 of the slide block 2 and the rail groove A1 of the guiding member A together form the inner ball race for passing through the balls 5, and the race in the ball race member 1 is regarded as the outer ball race. The inner ball race and the outer ball race are connected with each other through the circulation member 3. Through providing the circulation members 3 at two ends of the slide block 2 along the first direction, revolve curves are formed at two ends of each of the combination of one inner ball race and the corresponding outer ball race, so that the ball circulating race C is formed. The end cover 4 can prevent the balls 5 from falling off the race during the revolve motion, and the curved surface of the revolve groove 42 of the end cover 4 allows the balls 5 to be guided to the next path after the balls 5 enters into the circulation member 3. In some embodiments, the balls 5 may be separated balls or may be balls connected by a retainer. It is understood that, for the sake of clarity, the balls 5 are not illustrated in the following drawings.

Figure 5:
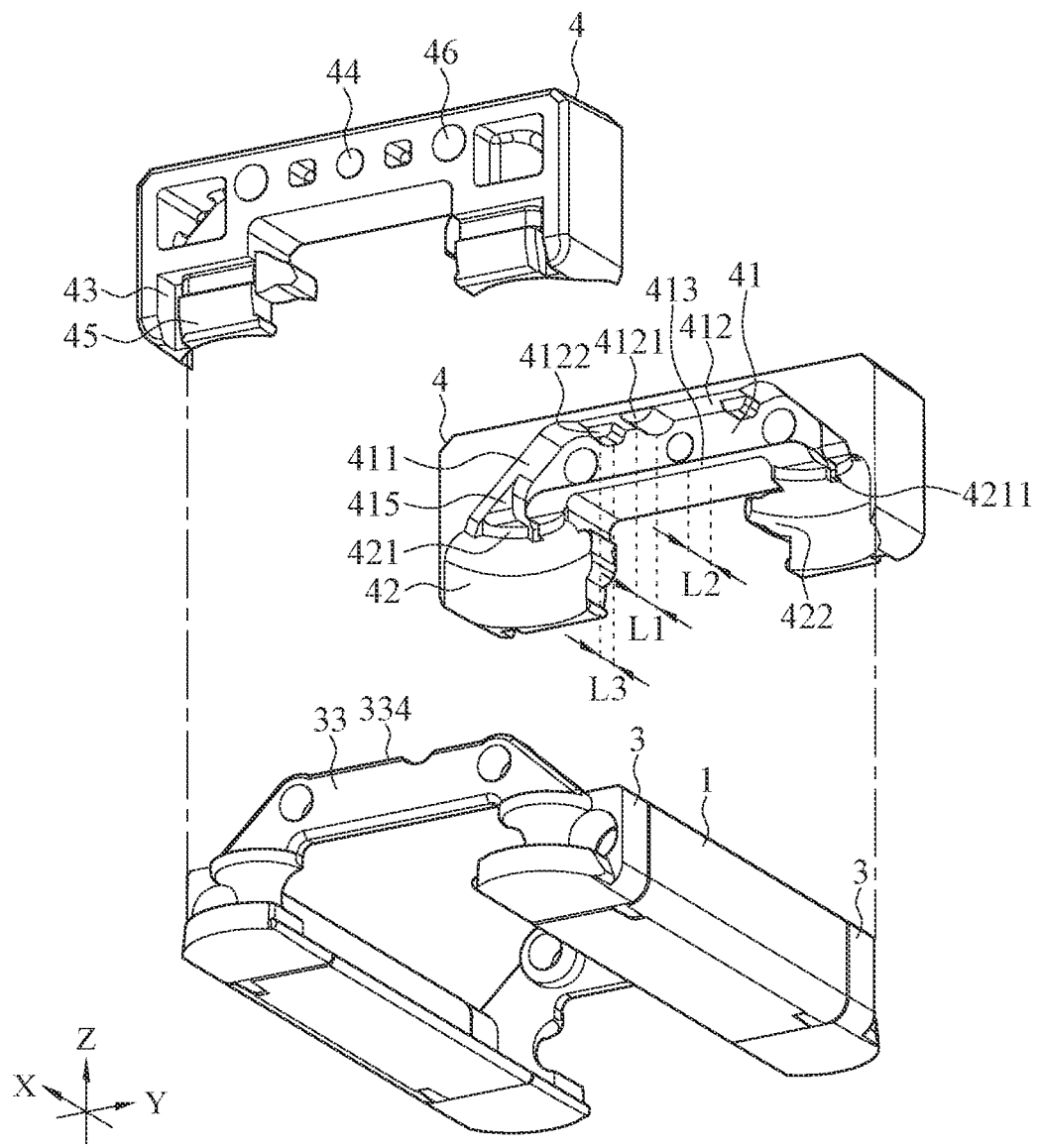
FIG. 5 illustrates another perspective view of the slide block assembly shown in FIG. 4, where the two end covers are not assembled to the slide block assembly.

Please refer to FIG. 4 and FIG. 5, the configuration of disposing the end cover 4 on the circulation member 3 is described. FIG. 4 illustrates a schematic perspective view showing the slide block assembly B is to be assembled with the end covers 4, where the slide block 2 of the slide block assembly B is not illustrated. FIG. 5 illustrates another perspective view of the slide block assembly B shown in FIG. 4, where the two end covers 4 are not assembled to the slide block assembly B.

As shown in FIG. 4 and FIG. 5, in this embodiment, each of the left and right ends of the circulation member 3 has a revolve channel member 32 protruding toward a direction away from the ball race member 1, and the plate-shaped portion 33 is above the two revolve channel members 32. Each of the left and right sides of the plate-shaped portion 33 has a guiding bevel 333, and a stopping plane 334 is between the two guiding bevels 333 and parallel to the bottom surfaces of the two revolve channel members 32. One side of the end cover 4 facing the circulation member 3 has a recess 41 cooperating with the circulation member 3, and two revolve grooves 42 are at two ends of the end of the end cover 4 facing the circulation member 3. Specifically, in this embodiment, the recess 41 cooperating with the circulation member 3 has two positioning bevels 411 cooperating with the two guiding bevels 333, and the recess 41 has a positioning plane 412 cooperating with the stopping planes 334.

Please refer to FIG. 4 and FIG. 5. According to one or some embodiments of the instant disclosure, through the aforementioned structures, when the end cover 4 is to be assembled on the circulation member 3, the end cover 4 may be pressed on the circulation member 3 along the front-rear direction; alternatively, as shown in FIG. 4, the end cover 4 may be assembled on the circulation member 3 along a top-down direction. Specifically, in this embodiment, when the end cover 4 is to be assembled on the circulation member 3 in the top-down direction, the two revolve grooves 42 at two ends of the end cover 4 are respectively fitted over the two revolve channel members 32 first. Next, since the left and right sides of the plate-shaped portion 33 of the circulation member 3 have the guiding bevels 333, and the recess 41 of the end cover 4 has the positioning bevel 411 corresponding to the guiding bevels 333, the end cover 4 is guided by the guiding bevels 333 and the positioning bevel 411 to slide to a predetermined transverse position of the end cover 4 after the end cover 4 contacts the plate-shaped portion 33 of the circulation member 3. Then, the end cover 4 is further moved until the positioning plane 412 is leaned against the stopping plane 334 of the plate-shaped portion 33, that is, in this embodiment, the end cover 4 reaches a predetermined longitudinal position of the end cover 4. In other words, in this embodiment, even if the initial assembling position of the end cover 4 is not the predetermined transverse position of the end cover 4, the end cover 4 can be automatically guided to the predetermined transverse position by the aforementioned structures during the assembling process. Next, during the assembling, the end cover 4 can be assembled downwardly until the end cover 4 is blocked by the stopping plane 334, which indicates that the end cover 4 reaches the predetermined longitudinal position of the end cover 4. Then, since the two positioning bevels 411 of the end cover 4 are cooperated with the two guiding bevels 333 of the plate-shaped portion 33, after the end cover 4 is blocked by the stopping plane 334, the positioning bevel 411 and the guiding bevel 333 both at the same side of the guiding member A are leaned against with each other, thereby providing a certain level of longitudinal positioning function for the end cover 4.

In one linear motion device known to the inventor, the end cover can only be assembled on the slide block assembly along the front-rear direction (the extension direction of the guiding member). Upon assembling the end cover of the linear motion device, the components are aimed with each other by the techniques of the operator or the special aiming configuration of the assembling device (e.g., the protrusion and the recess), and then the components are pressed toward each other for the assembling. However, when the components are miniaturized, the assembling tolerance of the components becomes smaller, thus greatly increasing the assembling difficulty for the miniaturized components. When the assembled components are slightly deviated, stepped structures are formed owing to the misalignments of the relative positions of the internal components of the assembled slide block assembly, or the components even cannot be assembled or engaged with each other properly. Thus, the overall precision of the slide block component is decreased to affect the operation of the device and/or reduce the assembling efficiency.

Conversely, according to one or some embodiments of the instant disclosure, through the two guiding bevels 333 on the plate-shaped portion 33, the stopping plane 334 between the two guiding bevels 333, and the end cover 4 with corresponding structures, the end cover 4 can be assembled on the circulation member 3 in the top-down manner. Therefore, during the assembling process, the end cover 4 can be automatically guided to the predetermined position. Hence, even for the micro motion device with higher precision requirements, the precision requirements for the assembling can be reduced owing to the aforementioned structures. Therefore, since the assembled position of the end cover 4 is already precisely positioned, the overall precision of the assembled device can be effectively increased, thereby achieving the semi-automatic assembling to a certain extent.

Please refer to FIG. 4 and FIG. 5. In some embodiments, for example, in this embodiment, when the slide block assembly B is observed along the first direction (the extension direction of the guiding member A, namely, the X-axis direction), an acute angle θ is between each of the two guiding bevels 333 and the corresponding revolve channel member 22. The two acute angles θ at the two opposite sides of the guiding member A may be the same or different. If the two acute angles θ are the same, the left and right sides of the end cover 4 can slide on the circulation member 3 with the same velocity upon the assembling process, thereby allowing the assembling process of the end cover 4 to become much smoother. Moreover, the two guiding bevels 333 may have the same bevel length L. Therefore, the left and right sides of the end cover 4 will have similar/substantially symmetrical assembling displacement path, thus also being helpful in allowing the assembling process of the end cover 4 to become much smoother.

Please refer to FIG. 4. In this embodiment, one side of the plate-shaped portion 33 away from the slide block 2 does not have components protruding toward the end cover 4. That is, in this embodiment, the side of the plate-shaped portion 33 away from the slide block 2 do not have any component extending along the front-rear direction (the first direction), so that the end cover 4 is ensured to be assembled on the circulation member 3 from the top-down direction.

Please refer to FIG. 4 and FIG. 5, especially FIG. 4. In this embodiment, each of the two revolve channel members 32 comprises an upper protrusion member 321, a lower protrusion member 322, and a connection member 323. The connection member 323 is connected to the upper protrusion member 321 and the lower protrusion member 322. When the end cover 4 is observed along the first direction, the upper protrusion member 321 and the lower protrusion member 322 are respectively at two opposite sides of the connection channel 311. Specifically, in this embodiment, the upper protrusion member 321 is above the connection channel 311, and the lower protrusion member 322 is below the connection channel 311. Moreover, in this embodiment, a longest extension distance D1 of the upper protrusion member 321 along the first direction is less than a longest extension distance D2 of the lower protrusion member 322 along the first direction.

Therefore, in these embodiments, when the slide block assembly B is observed along a top-down direction (namely, in a top view), the maximum area of the upper protrusion member 321 is less than the maximum area of the lower protrusion member 322. In other words, in these embodiments, in the top view, the upper protrusion member 321 does not protrude out of the lower protrusion member 322. Therefore, when the end cover 4 is assembled on the circulation member 3, the two revolve grooves 42 can be fitted over the two revolve channel members 32 smoothly.

Moreover, in this embodiment, the portion of the lower protrusion member 322 protruding out of the upper protrusion member 321 is served as the bottom surface of the revolve curve (where the semicircular path formed by the revolve channel member 32). Therefore, in the case that the portion of the lower protrusion member 322 protruding out of the upper protrusion member 321 is a portion of the one-piece circulation member 3, since the one-piece circulation member 3 is not formed by assembling two separated components with each other, stepped structures caused by assembling or component tolerances can be avoided between the portion of the revolve channel member 32 served as the bottom surface of the revolve curve and nearby portions. Therefore, the components of the linear motion device can be positioned at proper positions precisely. The balls 5 can thus roll stably through the junction between the extension member 31 and the revolve channel member 32 or the junction between the revolve channel member 32 and the inner ball race. In other words, in the case that the lower protrusion member 322 of the revolve channel member 32 protrudes out of the upper protrusion member 321 of the revolve channel member 32, the lower portions of the two revolve grooves 42 at two ends of the end cover 4 can be designed to be open ends (as shown in FIG. 5), so that the end cover 4 can be fitted over the circulation member 3 in a top-down manner. Accordingly, since the lower protrusion member 322 of the revolve channel member 32 is directly served as the bottom portion of the revolve curve, rather than the bottom portion of the revolve groove 42 of the end cover 4, the connection between the connection channel 311 in the extension member 31 and the revolve curve is not affected by the stepped structure between the end cover 4 and the revolve channel member 32.

Moreover, upon filling the balls 5 to the slide block assembly B, in the case that the lower protrusion member 322 protrudes out of the upper protrusion member 321, the balls 5 not only can be filled into the race in the ball race member 1 but also can be further filled into the revolve channel member 32. Next, the end cover 4 is assembled on the circulation member 3 in the aforementioned top-down manner, then the ball circulation race C can be formed with the balls 5 received in the ball circulation race C, thereby facilitating the filling efficiency of the balls 5 in the slide block assembly B. On the other hand, with regards to the configuration in which the circulation member 3 does not have the upper protrusion member 321 and the lower protrusion member 322 or with the configuration in which the lower protrusion member 322 does not protrudes out of the upper protrusion member 321, in order to fill the balls 5 in the ball circulation race C, the balls 5 have to be filled in the end cover 4 first, and then the end cover 4 and the circulation member 3 are carefully aligned and assembled with each other, so that the ball circulation race C can be formed. Accordingly, it is understood that, with the configuration in which the lower protrusion member 322 protrudes out of the upper protrusion member 321, the assembling difficulty of the linear motion device can be effectively reduced and the efficiency for ball filling can be increased, thereby further optimizing the automation of ball filling for the linear motion device.

In some embodiments, from the top view of the linear motion device, the area of the upper protrusion member 321 and the area of the lower protrusion member 322 are the same, and the lower portion of the revolve groove 42 of the end cover 4 has a bottom plate extending toward the revolve channel member 32. In other words, the portion of the lower protrusion member 322 protruding out of the upper protrusion member 321 in the aforementioned embodiments is rearranged to be the bottom plate at the lower portion of the revolve groove 42 of the end cover 4. Therefore, the end cover 4 can still be assembled on the circulation member 3 in the top-down manner. Hence, the circulation member 3 of this embodiment can also be utilized in the slide block assembly B.

Referring back to the embodiment that the lower protrusion member 322 protrudes out of the upper protrusion member 321, in this embodiment, since the bottom surface of the revolve curve is provided by the revolve channel member 32 itself rather than being formed after the circulation member 3 is assembled with the end cover 4, it is not necessary to ensure whether or not the portion of the end cover 4 served as the bottom surface of the revolve curve is assembled to the proper position, and even it is not necessary to allow the end cover 4 to cover the entire revolve curved groove 32a to be served as the bottom surface of the revolve curve. Specifically, in this embodiment, as long as the end cover 4, from the front view of the end cover 4, covers the upper protrusion member 321 and at least a portion of the connection member 323 (such as at least a half portion of the connection member 323) of the revolve curved groove 32a after the end cover 4 reaches its predetermined longitudinal position set by the stopping plane 334 of the plate-shaped portion 33, the space for circulatingly rolling the balls 5 can still be formed between the end cover 4 and the revolve channel member 32. In other words, in this embodiment, in the case that the lower protrusion member 332 protrudes out of the upper protrusion member 331, the end cover 4 can be positioned merely by the positioning of the stopping plane 334 of the plate-shaped portion 33 and the positioning plane 412 of the recess 4 without carefully considering the location of the lower portion of the end cover 4.

Next, as shown in FIG. 4, in this embodiment, a positioning groove 3341 is recessed from the stopping plane 334 of the plate-shaped portion 33, and a positioning protrusion 4121 protrudes from the positioning plane 412. When the end cover 4 and the circulation member 3 are assembled with each other, the positioning protrusion 4121 can be correspondingly received in the positioning groove 3341. Therefore, through respectively configuring positioning components on the stopping plane 334 of the plate-shaped portion 33 and the positioning plane 412 of the end cover 4, the end cover 4 can be prevented from sliding leftward or rightward along the guiding bevels 333 easily upon the end cover 4 is forced by a force along the left-right direction. Therefore, the end cover 4 can be positioned stably.

Figure 8:
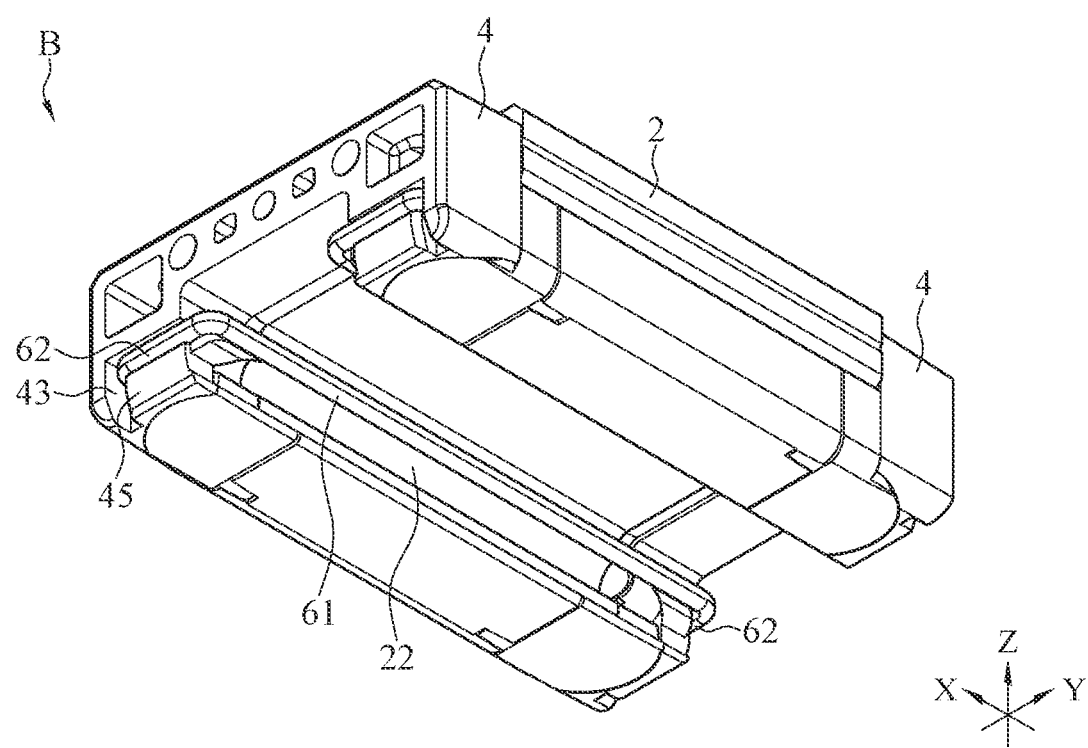
FIG. 8 illustrates another perspective view of the slide block assembly shown in FIG. 1 (the balls are not illustrated)

Then, please refer to FIG. 5 and FIG. 8. FIG. 8 illustrates another perspective view of the slide block assembly B shown in FIG. 1 (the balls 5 are not illustrated). In this embodiment, the lower portions of the two revolve grooves 42 at two ends of the end cover 4 can be designed to be open ends. In other words, the revolve grooves 42 are in communication with outside through their bottom portion. Moreover, even for the case that the lower portion of the revolve groove 42 has the bottom plate extending toward the revolve channel member 32, the revolve grooves 42 are stilled opened at the bottom and are thus in communication with outside. Therefore, in this embodiment, when the end cover 4 is to be fitted over the circulation member 3, the end cover 4 can be fitted over the revolve channel member 32 from the open end at the lower portion of the circulation member 3. In some embodiments, when the end cover 4 is assembled on the circulation member 3 (e.g., when the positioning plane 412 abuts against the stopping plane 334 of the plate-shaped portion 33), the bottom portion of the end cover 4 can be coplanar with the bottom of the lower protrusion members 322. Moreover, the shape of the lower portion of the revolve groove 42 of the end cover 4 may correspond to the shape of the lower protrusion member 322. Therefore, the bottom portion of the end cover 4 and the lower protrusion member 322 can be closely mated with each other to prevent dusts from entering into the ball circulating race C.

Figure 6:
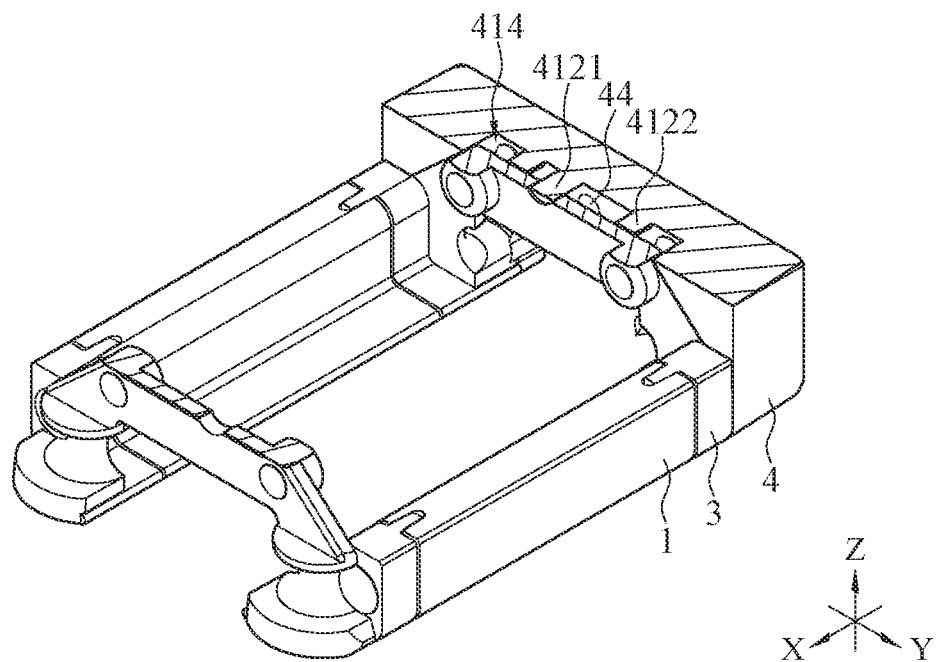
FIG. 6 illustrates a partial sectional view of the linear motion device along the line 6-6 shown in FIG. 4 (only the end cover at one side of the slide block assembly is illustrated)

Please refer to FIG. 5 and FIG. 6. FIG. 6 illustrates a partial sectional view of the linear motion device along the line 6-6 shown in FIG. 4. In this embodiment, the end cover 4 has an oil inlet 44 and a leaning plate 413. Specifically, in this embodiment, the recess 41 of the end cover 4 has the leaning plate 413. The leaning plate 413 may be at the lower portion of the recess 41 and extends toward the plate-shaped portion 33 (along the first direction). A length of the leaning plate 413 along the first direction L2 is less than a depth of the recess 41 along the first direction. When the end cover 4 is assembled on the circulation member 3, one side of the leaning plate 413 near to the plate-shaped portion 33 of the circulation member 3 abuts against the plate-shaped portion 33, so that a cavity 414 is formed by the recess 41 of the end cover 4 and the plate-shaped portion 33 (as shown in FIG. 6). The oil inlet 44 of the end cover 4 corresponds to the cavity 414, and the oil inlet 44 is in communication stably with one side of the end cover 4 away from the slide block 2 and the cavity 414. Moreover, the cavity 414 is further in communication with the two revolve grooves 42.

In one or some embodiments, through the oil inlet 44 and the cavity 414 in communication with the two revolve grooves 42, lubricating oil can be poured into the cavity 414 from the oil inlet 44 and then flow into the two revolve grooves 42 to lubricate the balls 5 in the ball circulating race C, thereby reducing wears between components of the linear motion device. Therefore, the operation of the slide block assembly B can be performed smoothly and the service lives of the components of the slide block assembly B can be prolonged. Moreover, the two positioning bevels 411 at the two sides of the recess 41 are cooperated with the two guiding bevels 333 of the plate-shaped portion 33, and the positioning plane 412 of the recess 41 is cooperated with the stopping plane 334 of the plate-shaped portion 33. Therefore, when the plate-shaped portion 33 leans against the leaning plate 413, the two positioning bevels 411 are respectively attached to the two guiding bevels 333, and the positioning plane 412 is attached to the stopping plane 334 (as shown in FIG. 4). Hence, the lubricating oil poured into the cavity 414 does not leak out from the top portion or two sides of the end cover 4. Furthermore, since the positioning bevels 411 are at the two sides of the recess 41, the two sides of the cavity 414 formed by the recess 41 are also bevels. Therefore, when the lubricating oil is poured into the cavity 414 from the oil inlet 44 and flows to the two sides of the cavity 414, the lubricating oil flows along and is guided by the two positioning bevels 411 at the two sides of the recess 41 to flow toward the two revolve grooves 42.

Please refer to FIG. 5. In this embodiment, a recessed flange 421 is above each of the two revolve grooves 42. Each of the recessed flanges 421 is correspondingly connected to the corresponding upper protrusion member 321 (in other words, in this embodiment, the shape of the recessed flange 421 corresponds to the shape of the upper protrusion member 321). Therefore, the end cover 4 can be closely and firmly connected to the revolve channel member 32. Each of the two recessed flanges 421 has a slot 4211. Therefore, when the two recessed flanges 421 are connected to the two upper protrusion members 321, the cavity 414 can be still in communication with the two revolve grooves 42 through the slots 4211. Moreover, in one or some embodiments, through the slots 4211, the lubricating oil in the cavity 414 can flow toward the revolve grooves 42 in a slower speed, so that the lubricating effect can be extended.

Please refer to FIG. 5. In this embodiment, the left and right sides of the leaning plate 413 respectively extend on the two recessed flanges 421. Moreover, regarding portions of the leaning plate 413 above the two recessed flanges 421, bottom surfaces thereof respectively lean against the two revolve channel members 32. Therefore, the leaning plate 413 can also facilitate the longitudinal positioning of the end cover 4. Furthermore, the left and right sides of the leaning plate 413 can be respectively connected to the two slots 4211 of the two recessed flanges 421. In other words, in this embodiment, the left side of the leaning plate 413 is connected to the edge of the left slot 4211, and the right side of the leaning plate 413 is connected to the edge of the right slot 4211. Therefore, the lubricating oil in the cavity 414 can be guided into the two slots 4211 through the aforementioned configuration.

In this embodiment, the positioning plane 412 of the end cover 4 has a leaning protruding spot 4122. For example, as shown in FIG. 5, two leaning protruding spots 4122 are at the left and right side of the positioning protrusion 4121 on the positioning plane 412. The leaning protruding spot 4122 is provided for further abutting against the plate-shaped portion 33 to maintain the volume of the cavity 414 (as shown in FIG. 6). Hence, a length of the leaning protruding spot 4122 along the first direction L3 is the same as a length of the leaning plate 413 along the first direction L2, and the length of the leaning protruding spot 4122 along the first direction L3 is less than a length of the positioning protrusion 4121 along the first direction L1 (these lengths are all counted from the surface of the recess 41 parallel to the plate-shaped portion 33).

Please refer to FIG. 5. In this embodiment, a leaning member 415 is between each of the positioning bevels 411 of the recess 41 and the corresponding revolve channel member 32. Specifically, in this embodiment, one of two sides of the leaning member 415 leans against the positioning bevel 411, and the other side of the leaning member 415 leans against the revolve channel member 32. Therefore, the leaning member 415 can also facilitate the longitudinal positioning of the end cover 4. Moreover, the two leaning members 415 can support the plate-shaped portion 33 at two sides of the plate-shaped portion 33 so as to help maintain the volume of the cavity 414. In this embodiment, a length of the leaning member 415 along the first direction is the same as the length of the leaning plate 413 along the first direction L2, so that the leaning member 415 and the leaning plate 413 together lean against the plate-shaped portion 33. Moreover, in some embodiments, the side surface of the leaning member 415 is connected to the nearby slot 4211, so that the leaning member 415 facilitates in guiding the lubricating oil in the cavity 414 to flow into the slot 4211.

Figure 7:
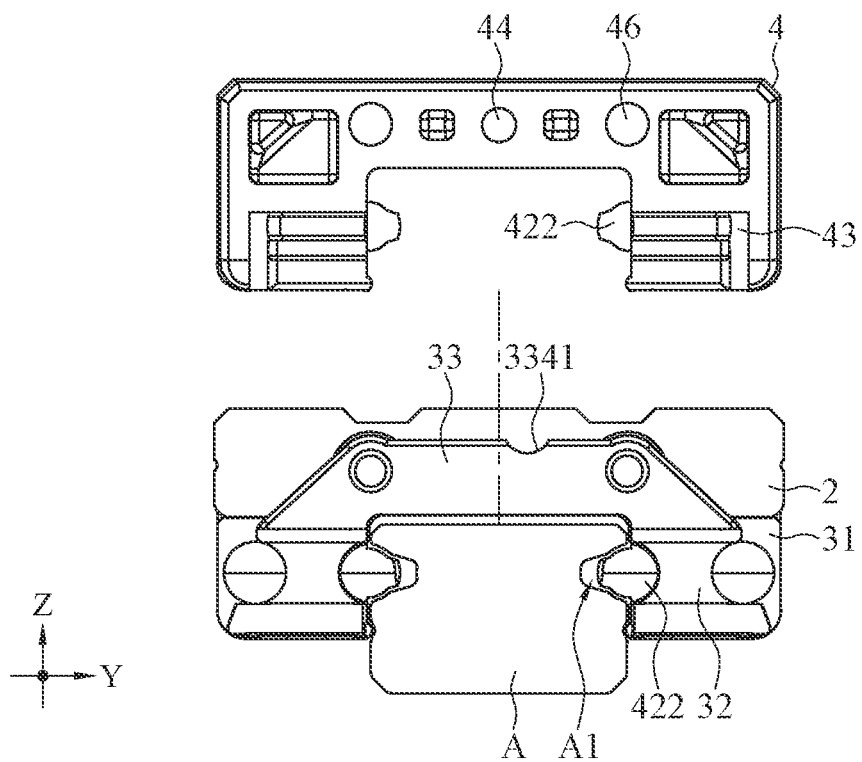
FIG. 7 illustrates a front schematic view of the slide block assembly shown in FIG. 4 (the slide block is illustrated)

Next, please refer to FIG. 5 and FIG. 7. FIG. 7 illustrates a front schematic view of the slide block assembly B shown in FIG. 4. In this embodiment, regarding the two revolve grooves 42 at the two ends of the end cover 4, one side thereof near to the guiding member A has an auxiliary wall 422 extending toward a nearby rail groove A1 to extend a curved surface of the revolve groove 42 into the rail groove A1. Accordingly, when the balls 5 pass through the connection channel 311 in the extension member 31 from the outer ball race and enter into the revolve curve formed by the revolve channel member 32 and the revolve groove 42, the balls 5 can be guided into the inner ball race smoothly and stably. On the other hand, when the balls 5 are to enter into the revolve curve from the inner ball race, the balls 5 can be guided by the auxiliary wall 422 to enter into the revolve curve smoothly.

Please refer to FIG. 7. In this embodiment, when the end cover 4 is observed along the first direction (for example, in a front view of the end cover 4), the oil inlet 44 of the end cover 4 is misaligned with the positioning groove 3341 of the plate-shaped portion 33. In other words, in this embodiment, when the end cover 4 is assembled on the circulation member 3, the oil inlet 44 does not overlap with the positioning groove 3341 in the front view of the end cover 4, and a top-down connection line passing a center portion of the oil inlet 44 along the third direction does not overlap with a top-down connection line passing through a center portion of the positioning groove 3341. Therefore, with such configuration, since the positioning protrusion 4121 and the positioning groove 3341 are not directly behind the oil inlet 44, when the lubricating oil is poured into the end cover 4 from the oil inlet 44, the probability of oil leakage from the gap between the positioning protrusion 4121 and the positioning groove 3341 caused by larger initial pouring pressure can be reduced.

Next, please refer to FIG. 8. As mentioned above, when the two end covers 4, the two circulation members 3, the slide block 2, and the two ball race members 1 are assembled with each other, the two buckling portions 62 at the two ends of the retaining member 6 are respectively pushed to the two assembling grooves 43 along assembling bevels 45 of the two end covers 4, so that the two end covers 4 are pressed toward the slide block 2 to achieve the assembling of the slide block assembly B. Then, the retaining portion 61 passes through the slide block 2 to be disposed near to the ball groove 22 of the slide block 2. Therefore, the balls 5 (not shown in FIG. 8) can be kept within certain positions of the slide block assembly B to prevent the balls 5 from detaching off the slide block assembly B.

Figure 9:
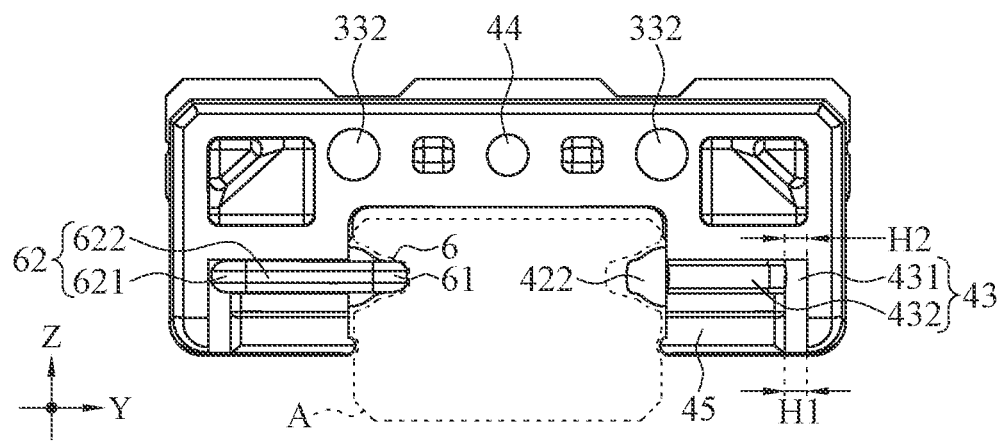
FIG. 9 illustrates a front schematic view of the slide block assembly shown in FIG. 1, where the balls and the right retaining member are not shown.

Specifically, please refer to FIG. 9. FIG. 9 illustrates a front schematic view of the slide block assembly B shown in FIG. 1, where the balls 5 and the right retaining member 6 are not shown. In this embodiment, the assembling groove 43 has a first groove portion 431 and a second grove portion 432, and the first groove portion 431 and the second groove portion 432 are in communication with each other. When the end cover 4 is observed along the first direction, the first groove portion 431 is perpendicular to the second groove portion 432, and the second groove portion 432 is parallel with the positioning plane 412 of the end cover 4. The bottom end of the first groove portion 431 is an open end, and one end of the second groove portion 432 facing the guiding member A is an opened end. The opening of the second groove portion 432 may correspond to the auxiliary wall 422.

Figure 10:
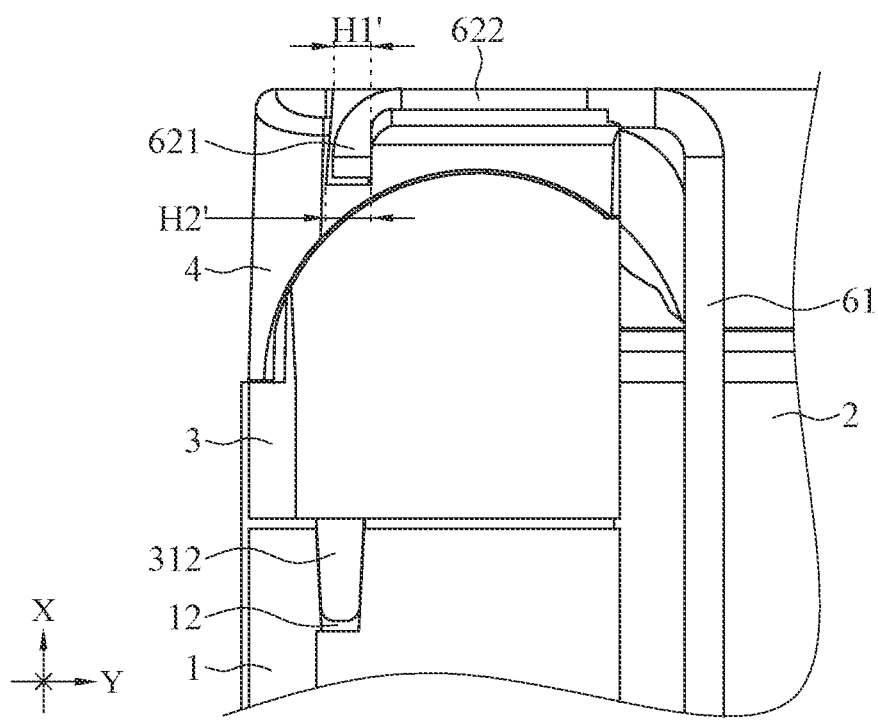
FIG. 10 illustrates an enlarged partial bottom view of the left front portion of the slide block assembly shown in FIG. 9.

Please refer to FIG. 9 and FIG. 10. FIG. 10 illustrates an enlarged partial bottom view of the left front portion of the slide block assembly B shown in FIG. 9 (the guiding member A is not illustrated). In this embodiment, the buckling portion 62 of the retaining member 6 has an abutting portion 621 and a stopping portion 622. The abutting portion 621 is at one end of the stopping portion 622. Moreover, from the bottom view of the slide block assembly B, an extension direction of the abutting portion 621 is perpendicular to an extension direction of the stopping portion 622. When the retaining member 6 is to be assembled with the assembling groove 43, the abutting portion 621 of the buckling portion 62 is firstly placed into the first groove portion 431, and then the stopping portion 622 of the buckling portion 62 is moved toward the second groove portion 432 along the assembling bevel 45 and engaged into the second groove portion 432. Therefore, the end cover 4 can be prevented from detaching off the retaining member 6. Next, the retaining portion 61 of the retaining member 6 can lean against the auxiliary wall 422 and can be inserted into the rail groove A1 of the guiding member A. Therefore, the auxiliary wall 422 can be provided for supporting and positioning the retaining member 6.

Next, please refer to FIG. 9. According to this embodiment, when the end cover 4 is observed along the first direction, an entrance width H1 of the first groove portion 431 may equal to an exit width H2 of the first groove portion 431, thus allowing the precision of the entire first groove portion 431 to be controlled much more easily. Furthermore, as shown in FIG. 10, in the bottom view of the slide block assembly B, a width H1' of one end of the first groove portion 431 away from the slide block 2 may be less than a width H2' of one end of the first groove portion 431 near to the slide block 2. Therefore, when the abutting portion 621 of the buckling portion 62 is to be assembled with the assembling groove 43, owing to that the width H2' of the end of the first groove portion 431 is larger, the end portion of the abutting portion 621 can be aligned to the assembled position in the assembling groove 43 more easily. Moreover, after the abutting portion 621 of the buckling portion 62 is inserted into the assembling groove 43, owing to that the width H1' of the end of the first groove portion 431 is smaller, the abutting portion 621 can be positioned to the correct position and closely fitted with the assembling groove 43.

Based on the above, a linear motion device is provided. According to one or some embodiments of the instant disclosure, the linear motion device has the two guiding bevels 333 and the stopping plane 334 of the plate-shaped portion 33, and the linear motion device further has the end cover 4 corresponding to the guiding bevels 333 and the stopping plane 334. Therefore, when the end cover 4 is assembled on the circulation member 3 along the top-down direction, even if the initial assembling position of the end cover 4 is not correct, the end cover 4 can still be automatically guided to the predetermined transverse position by the guiding bevels 333. Next, the end cover 4 can be assembled downwardly until the end cover 4 is blocked by the stopping plane 334 which indicates that the end cover 4 reaches the predetermined longitudinal position. Therefore, the assembling of the end cover 4 can be achieved.

On the other hand, in one or some embodiments, only the stopping plane 334 of the plate-shaped portion 33 is provided to position the longitudinal position of the end cover 4. As long as the lower protrusion member 322 protrudes out of the upper protrusion member 321 in the top view of the linear motion device and the end cover 4 can at least cover the upper portion of the revolve curve groove in the front view of the linear motion device, a space for circulatingly rolling the balls 5 is still formed between the end cover 4 and the revolve channel member 32, so that the assembling of the end cover 4 can be achieved as well. Moreover, since the lower protrusion member 322 protrudes out of the upper protrusion member 321, the lower protrusion member 322 can be served as the bottom surface of the revolve curve. Hence, stepped structures caused by assembling or component tolerances are not formed between the bottom surface and nearby portions, and the components of the linear motion device can be positioned at proper positions precisely. Therefore, the balls 5 can roll stably through the junction between the extension member 31 and the revolve channel member 32 or the junction between the revolve channel member 32 and the inner ball race.

Accordingly, in one or some embodiments of the instant disclosure, the end cover 4 can be positioned or assembled easily, thereby greatly reducing the precision requirement upon assembling. Moreover, since the assembled position of the end cover 4 is already precisely positioned, the overall precision of the assembled device can be effectively increased.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A linear motion device, comprising:
   a guiding member extending along a first direction, wherein two rail grooves are at two opposite sides of the guiding member parallel to the first direction; and
   a slide block assembly slidably assembled on the guiding member, wherein the sliding block assembly comprises:
   a slide block slidably disposed across the guiding member, wherein the slide block has two ball grooves respectively corresponding to the two rail grooves; each of the two rail grooves and the corresponding ball groove together form an inner ball race;
   two ball race members extending along the first direction and respectively disposed at two opposite sides of the slide block, wherein each of the two ball race members has an outer ball race;
   a first circulation member and a second circulation member respectively disposed at two opposite sides of the slide block along the first direction, wherein the first circulation member and the second circulation member are respectively in communication with the two inner ball races and the two outer ball races; the first circulation member comprises:

a plate-shaped portion abutting against the slide block, wherein the plate-shaped portion has a stopping plane; and two revolve channel members protruding from one side of the first circulation member away from the slide block, wherein each of the two revolve channel members has a revolve curved groove, and each of the two revolve curved grooves is in communication with the corresponding outer ball race through a communication channel; each of the revolve channel members comprises an upper protrusion member, a lower protrusion member, and a connection member, the connection member is connected to the upper protrusion member and the lower protrusion member; a longest extension distance of the upper protrusion member along the first direction is less than a longest extension distance of the lower protrusion member along the first direction;

a first end cover and a second end cover respectively assembled on the first circulation member and the second circulation member, wherein one surface of the first end cover away from the slide block has two assembling grooves, and one surface of the second end cover away from the slide block has two assembling grooves; one surface of the first end cover near to the slide block has a recess to receive the plate-shaped portion, and the recess has a positioning plane cooperating with and leaning against the stopping plane; when the positioning plane of the first end cover correspondingly leans against the stopping plane of the plate-shaped portion, the first end cover at least covers the upper protrusion member and the connection member of the corresponding revolve curved groove;

a plurality of balls; and two retaining members, wherein each of the two retaining members passes through the corresponding inner ball race; one of two ends of each of the retaining members is embedded into one of the two assembling grooves of the first end cover, and the other end of each of the retaining members is embedded into one of the two assembling grooves of the second end cover;

wherein the two inner ball races, the first circulation member, the first end cover, the two outer ball races, the second circulation member, and the second end cover together form two ball circulation races, and the balls are rollably received in the two ball circulation races.

2. The linear motion device according to claim 1, wherein the first circulation member further comprises two extension members respectively extending from two ends of one side of the first circulation member facing the two ball race members along the first direction; the communication channel is in each of the two extension members, and each of the two extension members is connected to the corresponding ball race member.

3. The linear motion device according to claim 2, wherein each of the two extension members has a latch member protruding toward the corresponding ball race member; each of the two ball race members comprises a latch groove, and the two extension members and the two ball race members are connected with each other through the two latch members and the two latch grooves.

4. The linear motion device according to claim 1, wherein the first end cover comprises a leaning plate, an oil inlet, and two revolve grooves; the leaning plate is in the recess and abuts against the plate-shaped portion, so that a cavity is formed between the plate-shaped portion and the first end cover; the oil inlet corresponds to the cavity and is in communication with the cavity; the two revolve grooves are at two sides of the first end cover, and the cavity is in communication with the two revolve grooves.

5. The linear motion device according to claim 4, wherein a bottom of the leaning plate leans against the two revolve channel members; a recessed flange is above each of the two revolve grooves, and the two recessed flanges are correspondingly connected to the two upper protrusion members; each of the two recessed flanges has a slot, and the cavity is in communication with each of the revolve grooves through the corresponding slot.

6. The linear motion device according to claim 5, wherein each of two sides of the plate-shaped portion has a guiding bevel, and the stopping plane is between the two guiding bevels, and the recess has two positioning bevels cooperating with and leaning against the guiding bevels.

7. The linear motion device according to claim 6, wherein the positioning plane of the first end cover has a leaning protruding spot, and a length of the leaning protruding spot along the first direction is the same as a length of the leaning plate along the first direction.

8. The linear motion device according to claim 1, wherein a positioning groove is recessed from the stopping plane, a positioning protrusion protrudes from the positioning plane, and the positioning protrusion is correspondingly received in the positioning groove.

9. The linear motion device according to claim 1, wherein each of two ends of the first end cover has a revolve groove; an auxiliary wall extends from one side of the revolve groove near to the guiding member toward a nearby rail groove to extend a curved surface of the revolve groove into the corresponding rail groove.

10. The linear motion device according to claim 1, wherein the stopping plane is parallel to bottom surfaces of the two revolve channel members, and a bottom surface of the first end cover and the bottom surfaces of the two revolve channel members are coplanar.

* * * * *